| United States Patent [19] | [11] 3,709,563 |
|---|---|
| Shellhause | [45] Jan. 9, 1973 |

[54] METERING VALVE ASSEMBLY FOR COMBINATION VALVE

[75] Inventor: Ronald L. Shellhause, Vandalia, Ohio

[73] Assignee: General Motors Corporation, Detroit, Mich.

[22] Filed: Sept. 17, 1970

[21] Appl. No.: 72,987

[52] U.S. Cl.............303/6 C, 137/513.5, 137/514.5, 137/517, 303/84 A
[51] Int. Cl..........B60t 8/26, B60t 11/34, B60t 17/22
[58] Field of Search............303/6 C, 84 A; 60/545 E; 137/513.3, 513.5, 517, 493.6, 493.9, 514.5

[56] References Cited

UNITED STATES PATENTS

| 3,473,849 | 10/1969 | Smith et al. | 303/6 C |
| 3,526,437 | 9/1970 | Lewis | 303/6 C |
| 3,462,201 | 8/1969 | Lewis et al. | 303/6 C |
| 3,480,333 | 11/1969 | Stelzer | 303/6 C |
| 3,447,836 | 6/1969 | Doerfler | 303/6 C |
| 3,612,618 | 10/1971 | Swanson | 303/6 C |

Primary Examiner—Milton Buchler
Assistant Examiner—John J. McLaughlin
Attorney—W. E. Finken and D. D. McGraw

[57] ABSTRACT

A metering valve assembly for the front disc brakes of a dual circuit brake system which has rear drum brakes. The metering valve assembly is disclosed as a part of a combination valve assembly for a dual circuit brake system in which the metering valve is in one circuit, a proportioning valve is in the other circuit, and a hydraulically reset pressure loss warning indicator unit is sensitive to both circuits. The metering valve assembly has a metering valve pin provided with a grooved or knurled land and a smooth surfaced land in the valving section of the pin, and a rubber-like, resilient metering valve member mounted about the pin and having an outer section cooperating with a shoulder on the metering valve housing to form a first valve and an inner section extending axially over the valving section area of the pin and cooperating with that valving section to form a second valve.

5 Claims, 1 Drawing Figure

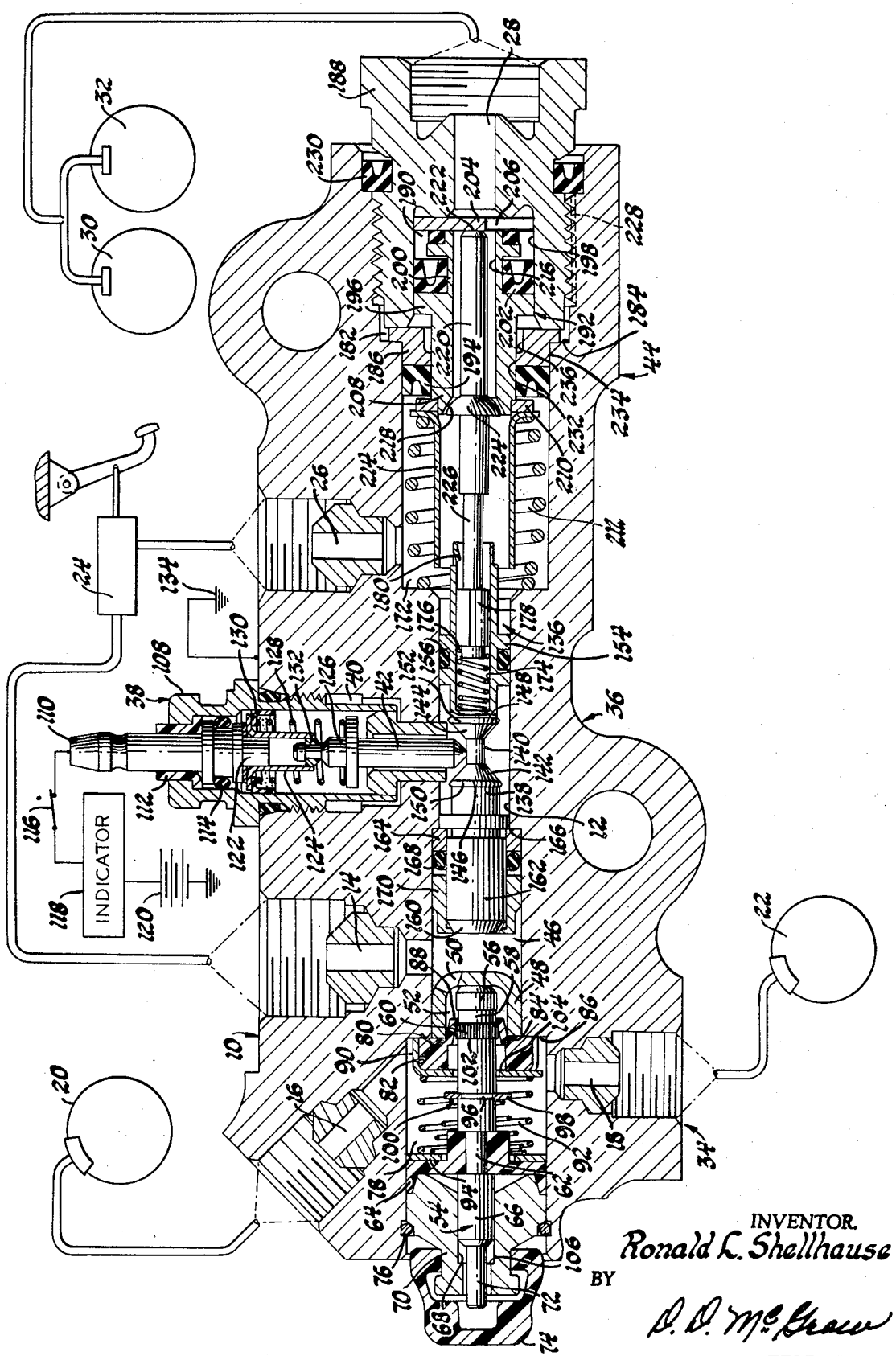

METERING VALVE ASSEMBLY FOR COMBINATION VALVE

SUMMARY OF THE INVENTION

The invention relates to a metering valve for a brake circuit, and more particularly to one having a metering valve pin provided with a grooved or knurled land and a smooth surfaced land in the valving section of the pin, and a metering valve member mounted about the pin and having an outer section cooperating with the metering valve housing shoulder to form a first valve and an inner section cooperating with the pin valving section to form a second valve. In the position of the valve assembly prior to brake application, the second valve is open through the grooves formed by the grooved or knurled construction of the one pin land so that pressure can initially be provided through the metering valve assembly to the disc brakes. The metering valve pin is moved by supply pressure relative to the metering valve member so that the inner section of the valve member engages the smooth land of the pin valving section, closing the second valve. When sufficient additional pressure has been exerted, acting on the valve member and the pin, the metering valve is moved against a yieldable element to open the first valve in metering relation so that pressure is then metered through the valve until the blend pressure is reached. Upon brake pressure release, when the first valve closes, the inner section of the valve member permits relatively unrestricted return flow of brake fluid. The grooved or knurled land is again received by the valve member inner section to maintain fluid communication across the valve. In the preferred form of the invention, the inner section of the inner valve member is formed as a generally axially extending annular lip which tapers slightly inwardly to engage the pin valving section.

IN THE DRAWING

The single FIGURE illustrates mechanism embodying the invention, with parts in section, and with a schematic showing of the brake system and warning circuits.

DESCRIPTION OF THE PREFERRED EMBODIMENT

The housing 10 is provided with a through bore 12 having several shoulders thereon and divided into several chambers as will be described. The front brake pressure inlet 14 connects with a left center portion of the bore 12, and outlets 16 and 18 connect with the left end portion of the bore 12. These outlets are connected to the two front disc brakes 20 and 22 of the vehicle. The rear brake pressure from the master cylinder 24 passes through inlet 26, connected to the right center portion of the bore 12, and the outlet 28 at the right end of the bore 12 is connected to the rear brakes 30 and 32.

The left portion 34 of the assembly comprises the metering section, which prevents initial front disc brake pressure buildup until the rear brake shoes contact the drums. The pressure thus held off is then admitted to the front brakes at higher input pressures.

The center portion 36 of the assembly comprises a warning section including a latch-type hydraulic reset warning switch assembly and actuator. The switch assembly 38 is threaded into a housing opening 40 so that the switch plunger 42 extends into the center portion of the housing bore 12.

The right portion 44 of the assembly includes a proportioner section comprising a rear brake pressure proportioner and a proportioner override arrangement.

METERING SECTION

Front brake pressure enters inlet 14 and chamber 46, provided in a part of bore 12. The left side of chamber 46 is defined by the valve pin stop 48. This stop is cup shaped, and is provided with one or more openings 50 through which chamber 46 is connected to the chamber 52 inside the cup. The metering valve pin 54 has a smooth head 56 positioned in chamber 52 and separated by a groove 58 from a knurled pin section 60. The pin extends leftwardly to a reduced pin section 62 about which diaphragm seal 64 is mounted. The pin land 66 is slidably mounted in a bore 68 formed through the valve plug 70. The pin reduced end 72 extends outwardly through the valve plug and is covered by the metering valve boot 74. The valve plug 70 is held in the left end of the housing bore by retainer ring 76.

The chamber 78 between diaphragm seal 64 and the valve pin stop 48 contains the metering valve 80. The outer portion 82 of valve 80 acts as a valve which sealingly engages a valve seat 84 formed by the valve pin stop 48 and a shoulder 86 of bore 12. The annular portion of metering valve 80 has an axially extending annular section or lip 88 which (in the position shown) receives and engages the outer periphery of the pin knurled land 60. A valve retainer and spring seat 90 presses against the other side of metering valve 80 relative to valve pin stop 48 and is engaged by compression spring 92, which also acts against spring seat 94 and the outer periphery of diaphragm seal 64. The portion of pin 54 intermediate land 60 and section 62 has a groove 96 receiving a spring seat 98. Spring 100 seats against spring seats 94 and 98 and urges pin 54 rightwardly toward engagement by the end of head 56 with pin stop 48. The front brake pressure outlets 16 and 18 connect with chamber 78.

When brake pressure is initially applied, fluid passes through inlet 14, chamber 46, passages 50, chamber 52, and the axially grooved openings formed by the knurled land 60, to chamber 78. This initial pressure is between 0 and 30 psi. This light initial pressure in chamber 78 is transmitted to the front brakes 20 and 22 and also acts on diaphragm seal 64 to move metering valve pin 54 to the left against spring 100 until the shoulder 102 of the knurled land 60 engages the inner annulus 104 of spring retainer 90. This provides a first stop for the pin 54, at which time the smooth outer periphery of pin head 56 has moved to engage the lip 88 of the metering valve 80, blocking off further flow of fluid from chamber 52 to chamber 78.

Additional inlet pressure must now be built up before additional pressure can be supplied through the valve assembly to the front brakes. This pressure is called the "hold-off" pressure and is controlled by the effective area of the metering valve 80 and the load of spring 92. The "hold-off" pressure may be varied from 60 to 200 psi as required for a particular vehicle.

Continued increase in inlet pressure in chambers 46 and 52 acts on the effective area of the metering valve 80 and the head 56 of the metering valve pin 54 and eventually causes the pin 54, the valve 80, and the spring retainer 90 to move leftwardly against the forces of springs 92 and 100 to open the valve 82 relative to its seat 84. Inlet pressure is then admitted to chamber 78 past the outer periphery of valve seal 80 and acts on diaphragm seal 64 to move pin 54, with retainer 90 and valve 80, further to the left until the pin land 66 engages the shoulder 106 at the left end of bore 68. A transition between the inlet pressure and the pressure to the front brakes takes place as this occurs and this transition is completed at a pressure point called the "blend" pressure. The inlet pressure is thereafter the same as the pressure passing through outlets 16 and 18 to the front brakes. The blend pressure is controlled by the relationship of the effective area of diaphragm seal 64 and the spring load of springs 92 and 100.

Upon release of inlet pressure, pin 54 gradually moves rightwardly as do valve spring retainer 90 and valve 80, until the metering valve 80 again has its outer periphery 82 seating against the valve seat 84. As further release of inlet pressure occurs, the lip 88 of the metering valve lifts to allow pressure to flow from chamber 78 to chamber 52. This allows release of pressure to the front brakes 20 and 22 at a very small pressure differential. Upon complete release, pin 54 assumes the position shown so that chamber 78 is again connected to chamber 52 through the grooves formed by the knurls of pin land 60. These knurls and grooves provide free flow of brake fluid for compensation of change in volume of the hydraulic circuit due to thermal changes.

WARNING SECTION

The switch assembly 38 has a housing 108 threaded into an appropriate opening 40 in housing 10. A terminal 110 extends outwardly and is separated from housing 108 by insulator 112 and O-ring 114. Terminal 110 is electrically connected through a suitable switch 116 to an indicator 118 and a source of electrical energy schematically illustrated as battery 120. Indicator 118 may be a light, bell, or horn, by way of example. The inner end of terminal 110 is formed as a pin 122 around which steel collar 124 is received. Collar 124 extends downwardly beyond the end of pin 122. The upper end of plunger 42 is formed as a somewhat similar but slightly larger diameter pin 126 which is normally separated from pin 122 and is movable upwardly to engage collar 124 to close the switch contacts. A spring 128 urges terminal 110 with its collar 124 upwardly by acting through an insulated spring seat 130 while urging plunger 42 downwardly. A plastic insulator 132 about a reduced portion of the plunger pin 126 guides pin 126 in collar 124 and insulates them when the switch is open. Plunger 42 is grounded through assembly housing 10 as schematically illustrated by ground wire 134. The lower end of plunger 42 extends into the center portion of the bore 12 formed in housing 10.

The switch piston assembly 136, including piston 138, is positioned in the center portion of the bore 12 of housing 10 so that the piston grooved center section 140 is normally aligned with plunger 42, the plunger end being held in groove 140 by the force of spring 128. The groove has beveled sides 142 and 144 leading to shoulders 146, 148 and so positioned that movement of piston assembly 136 to either a leftwardly or rightwardly direction causes plunger 42 to be cammed upwardly to close contacts 124 and 126. The contacts are held in the closed position by engagement of the lower end of plunger 42 on one of the shoulders. The slightly larger lands 150 and 152 of shoulders 146 and 148 aid in holding plunger 42 on a shoulder once it has been positioned there.

The right end of piston 138 is formed as an enlarged land 154 provided with a seal 156. Land 154 and seal 156 guide and seal piston 138 in the right center position of bore 12. The left end of piston 138 has a land 158 of the same diameter as land 154 and guides piston 138 in the left center portion of bore 12. The left outer end 160 of the piston assembly is formed as a land 162 of smaller diameter than lands 154 and 158. A seal retainer 164 slidably fits over land 162 and has a smaller inner diameter than the diameter of lands 154 and 158, but a larger outer diameter than the diameter of those lands. For this purpose, the housing bore 12 is provided with a shoulder 166 against which retainer 164 normally is abutted. An O-ring seal 168 is received about the land 158 intermediate the retainer 164 and another sleeve-like retainer 170. Retainer 170 has the same inner and outer diameters as retainer 164. Retainers 164 and 170 and the seal 168 may move relative to piston 138 under certain conditions.

The left end 160 of piston 138 and one side of retainer 170 are exposed to master cylinder front brake pressure in chamber 46. The right end 154 of piston 138 is exposed to master cylinder rear brake pressure in chamber 172. Rear brake pressure inlet 26 is connected to the master cylinder 24 and to chamber 172.

The piston assembly 136 also has a recess or bore 174 formed in the right end of piston 138 and opening into chamber 172. Spring 176 fits in the inner end of bore 174 and seats on a guide 178 which is slidably received in bore 174. Guide 178 may be in the form of a grooved land, or may be a fluted member. In either case, it is secured to or formed as a part of a valve element of the proportioner section 44 described below in detail. An inwardly lanced tab 180 adjacent the open end of bore 174 provides a stop for guide 178 such that sufficient leftward movement of piston 138 will cause tab 180 to engage guide 178 and thereafter move the guide leftwardly with further leftward movement of piston 138. This provides a lost-motion connection discussed below.

So long as substantially normal front and rear brake pressures exist in chambers 46 and 172, the switch piston assembly 136 will be in the position shown. Should front brake pressure loss occur while rear brake pressure remains, the higher pressure in chamber 172 acting on the right end of piston 138 will move the piston assembly 136 leftwardly. Land 158 will cause seal retainers 164 and 170, as well as seal 168, to also move leftwardly with piston 138. This movement will move plunger 42 upwardly and over land 152 until it rests on shoulder 148. This will hold switch contacts 124 and 126 engaged, holding the warning circuit in the energized condition. When, for example, switch 116 is the vehicle ignition switch, indicator 118 will be energized so long as the ignition switch is closed and piston 138 remains in the actuated condition.

The warning section is hydraulically reset when the front brake system is repaired and front brake pressure is again applied in chamber 46. This pressure will act against the larger combined effective areas of seal retainer 170 and the left end 160 of piston 138 (as compared to the effective area of the right land of piston 138) to move piston assembly 136 rightwardly until the seal retainer 164 again engages the shoulder 166. This recenters the piston assembly and disengages the warning switch contacts 124 and 126.

Should rear brake pressure fall substantially below front brake pressure, the piston 138 moves rightwardly, with plunger 42 moving upwardly over land 150 and resting on shoulder 146. When the rear brake pressure is again available in chamber 172, the larger effective area of the right end of piston 138 relative to the effective area of the piston left end 160 permits rear brake pressure to move the piston 133 to the left until its land 158 engages retainer 164. Thus, the position shown is again assumed.

PROPORTIONER SECTION

The right end of the bore 12 through housing 10 is formed to provide chamber 172 and a larger chamber 182. The shoulder 184 separating the two chambers receives the annular flanged seal support member 186. The proportioning valve cap member 188 is threaded into chamber 182 and abuts against seal support 184 to hold it in place. Valve cap 188 has outlet 28 formed axially therein and has a chamber 170 in its inner end to which the outlet 28 is connected. The proportioning valve piston 192 is reciprocally received in chamber 190 and extends into chamber 172. It passes through seal support 186, as well as the V-block seal 194. Seal 194 faces chamber 172 and is supported by seal support 186.

The center flange 196 of piston 192 is piloted on the chamber wall 188 of chamber 190. Thus, chamber wall 198 is a bore and piloting surface. The reduced diameter outer end 200 of piston 192 provides a mounting for V-block seal 202, which faces outwardly toward chamber 190 and is backed up by flange 196. A piston stop 204 is mounted in the end of chamber 190 adjacent outlet 28. Piston stop 204 has one or more openings or radial slots 206 which provide for fluid connection between chamber 190 and outlet 28. The inner end 208 of piston 192 receives spring retainer 210 to provide a seat for compression spring 212 and spring guide 214. Thus, in the assembled position, spring 212 urges piston 192 to the right so that it abuts piston stop 204.

The piston stop 204 is formed to provide openings 206 of sufficient area so that the piston through-bore 216 is always fluid connected with chamber 190 and outlet 28 in unrestricted flow relation. The end of bore 216 is formed at inner piston end 208 to provide a valve seat 218. Valve seat 218 is one valve element of the proportioning valve, and is the element that moves during the usual proportioning action. The valve stem 220 extends through piston 192 so that its outer end 222 normally abuts piston stop 204. A center portion of valve stem 220 is provided with a valve element 224 which mates with valve seat 218. The part of valve stem 220 within bore 216 is sufficiently smaller than the bore to permit relatively unrestricted flow therethrough between chambers 172 and 190, subject to the valving action of valve element 224 and valve seat 218. The inner end 226 of valve stem 220 extends into piston bore 174 and has guide 178 formed thereon or secured thereto by suitable means. Thus, the lost motion connection is provided between valve stem 220 and the switch piston 138.

The mechanism is in the position illustrated before brake pressure is applied. Upon application of master cylinder rear brake pressure through inlet 26 and into chamber 172, pressurized fluid passes between valve element 224 and valve seat 218, through bore 216 and openings 206, and into chamber 190. It also passes through openings 206 into outlet 28. As the pressure builds up, it acts on the piston differential area defined by the area of piston 192 exposed to chamber 190 relative to the piston area exposed to chamber 172 so as to move piston 192 to the left against the force of spring 212. Since pressure is being built up substantially equally and normally in the front and rear brake supply lines, the hydraulic forces do not move the switch piston 138. As the rear brake pressure continues to build up, piston valve seat 218 moves toward valve element 224. This causes a reduction in output pressure to the rear brakes equivalent to the ratio of the differential areas of piston 192. The valve element 224 is axially positioned for this proportioning function by its stem. By reason of the lost motion mechanism and the light force of spring 176, the stem can move for some distance toward switch piston assembly 136 during brake release without exerting any significant force thereon. Therefore the valve 218, 224 functions as a rear brake pressure proportioner without disturbing the switch piston 138, and the relatively high pressure in chamber 190 as brake pressure is released opens the proportioning valve to permit quick and relatively unrestricted return of brake fluid to the master cylinder.

Should the front brake pressure fall substantially below the rear brake pressure, additional work must be done by the rear brakes, and this requires additional rear brake pressure. To get the maximum braking effort under this condition and yet keep brake pedal effort as low as possible, the action of the proportioner is overridden and held out of the system. Thus, when switch piston 138 moves leftwardly due to front brake pressure loss, the guide 178 is engaged by the tab 180 of piston 138 and pulls the valve stem 220 leftwardly to open valve element 224 well away from its seat 218. This forcible removal of the valve element 224 from its proportioning position allows full rear brake pressure to pass from chamber 172 through bore 216 to outlet 28. The leftward movement of valve piston 192 is limited by the engagement of the piston flange 196 with the outer side of seal support member 186. Thus, valve seat 218 cannot move leftwardly a sufficient distance to reinstate the proportioning action.

A vent groove 228 allows sufficient expansion of chamber 182 past V-block seal 230 for proper proportioner function. Should either seal 194 or 202 leak brake fluid to chamber 182, collection of fluid will take place in groove 228. However, seal 230 will permit the release of excess fluid leakage collection to allow proper proportioner function. The seal 230 can also function as a vacuum bleeding seal, allowing vacuum bleeding of new cars on assembly lines.

What is claimed is:

1. A metering valve assembly for a hydraulic brake circuit, said assembly comprising:
   a housing having a bore, pressure inlet means adapted to be connected to brake pressure generating means, and pressure outlet means adapted to be connected to hydraulically actuated brakes, said pressure inlet and outlet means connecting with said bore in axially spaced relation, said bore having a shoulder formed therein axially intermediate said pressure inlet means and said pressure outlet means and dividing said bore into a pressure inlet chamber and a pressure outlet chamber;
   a metering valve pin mounted axially in said bore and in radially spaced relation thereto and having a valving section;
   an annular valve member mounted in said bore about said pin and having the outer section thereof yieldably cooperating with said shoulder to form a first valve and the inner section thereof positioned circumferentially about and yieldably cooperating with said pin valving section in radially contracting relation to form a second valve;
   means yieldably urging said pin toward said inlet means;
   and means responsive to pressure in said pressure outlet chamber urging said pin away from said inlet means to close said second valve by axial movement of said pin valving section relative to said annular valve member inner section and radial contraction of said annular valve member inner section relative to said pin valving section;
   said valve member being responsive to a predetermined pressure increase in said pressure inlet chamber after closure of said second valve to open said first valve in metering relation, said valve member being thereafter responsive to a pressure decrease in said pressure inlet chamber to close said first valve and to open said second valve as the pressure in said pressure inlet chamber decreases below the pressure in said pressure outlet chamber to release pressure in said outlet means.

2. The valve assembly of claim 1, said annular valve member inner section expanding radially relative to said pin valving section to open said second valve in response to a pressure differential wherein pressure in said outlet chamber is greater than pressure in said inlet chamber, and means including a portion of said pin valving section and providing for fluid flow through said second valve independently of the position of said annular valve member relative to said pin valving section below a predetermined outlet chamber pressure which is sufficient to move said pin relative to said annular valve member inner section until said second valve is closed.

3. The valve assembly of claim 2, said pin valving section including an axially grooved land circumferentially engaged by said annular valve member inner section and providing therewith said fluid flow means,
   said pin valving section further including a smooth land adjacent said grooved land and engaged by said annular valve member inner section when said second valve is closed due to a greater pressure in said inlet chamber than in said outlet chamber and movement of said pin away from said inlet means.

4. The valve assembly of claim 3, said annular valve member inner section being formed as a generally axially extending annular lip tapering radially inwardly to normally engage said pin valving section.

5. The valve assembly of claim 3, said grooved land being knurled to provide said grooves forming said fluid flow means.

* * * * *